(12) United States Patent
Ha et al.

(10) Patent No.: US 7,518,799 B2
(45) Date of Patent: Apr. 14, 2009

(54) OPTICAL PLATE, METHOD OF MANUFACTURING OPTICAL PLATE, BACKLIGHT ASSEMBLY AND LIQUID CRYSTAL DISPLAY DEVICE

(75) Inventors: Ju-hwa Ha, Seoul (KR); Jung-wook Paek, Suwon-si (KR); Jin-sung Choi, Cheonan-si (KR); Byung-yun Joo, Seoul (KR); Jin-soo Kim, Seoul (KR); Min-young Song, Seoul (KR)

(73) Assignee: Samsung Electronics Co., Ltd. (KR)

( * ) Notice: Subject to any disclaimer, the term of this patent is extended or adjusted under 35 U.S.C. 154(b) by 2 days.

(21) Appl. No.: 11/746,702

(22) Filed: May 10, 2007

(65) Prior Publication Data
US 2007/0263292 A1    Nov. 15, 2007

(30) Foreign Application Priority Data
May 10, 2006  (KR) ...................... 10-2006-0041843
Mar. 5, 2007   (KR) ...................... 10-2007-0021353

(51) Int. Cl.
G02B 27/10    (2006.01)
G03B 21/60    (2006.01)
(52) U.S. Cl. ...................... 359/619; 359/621; 359/626; 359/455; 359/457; 349/57
(58) Field of Classification Search ......... 359/619–626, 359/455, 457, 459, 454, 460, 463, 452, 443; 349/62, 64, 65; 362/31, 301, 326, 329, 330, 362/612; 40/454, 453; 428/29, 167
See application file for complete search history.

(56) References Cited

U.S. PATENT DOCUMENTS

| | | | | |
|---|---|---|---|---|
| 2,728,013 | A * | 12/1955 | Tourshou et al. | 313/479 |
| 6,139,162 | A * | 10/2000 | Masaki | 362/618 |
| 6,157,491 | A * | 12/2000 | Watanabe et al. | 359/619 |
| 6,169,633 | B1 * | 1/2001 | Watanabe | 359/626 |
| 6,628,460 | B1 * | 9/2003 | Ookawa et al. | 359/455 |
| 6,865,834 | B2 * | 3/2005 | Oda et al. | 40/454 |
| 6,870,674 | B2 * | 3/2005 | Ookawa et al. | 359/455 |
| 7,054,068 | B2 * | 5/2006 | Yoshida et al. | 359/624 |

FOREIGN PATENT DOCUMENTS

| | | |
|---|---|---|
| JP | 2004-006256 | 1/2004 |
| JP | 2005-301183 | 10/2005 |
| KR | 1020050068216 | 7/2005 |

* cited by examiner

*Primary Examiner*—Loha Ben
(74) *Attorney, Agent, or Firm*—F. Chau & Associates, LLC

(57) ABSTRACT

An optical plate includes a main body plate, and a plurality of lens patterns formed on a first surface of the main body plate, wherein the lens patterns are elongated in a first direction and arranged in parallel with each other in a second direction crossing the first direction, wherein a cross section of the lens patterns form a part of an ellipse shape, the ratio of a semi-major axis to a semi-minor axis of the ellipse shape ranging from about 1.65 to about 1.75.

19 Claims, 8 Drawing Sheets

OPTICAL PLATE, METHOD OF MANUFACTURING OPTICAL PLATE, BACKLIGHT ASSEMBLY AND LIQUID CRYSTAL DISPLAY DEVICE

CROSS-REFERENCE TO RELATED PATENT APPLICATIONS

This application claims priority to Korean Patent Application Nos. 2006-0041843, filed on May 10, 2006, and 2007-0021353, filed on Mar. 5, 2007, the disclosures of which are herein incorporated by reference in their entireties.

BACKGROUND OF THE INVENTION

1. Technical Field

The present disclosure relates to an optical plate, a method of manufacturing an optical plate, a backlight assembly and a liquid crystal display device.

2. Discussion of Related Art

In general, a liquid crystal display device includes a liquid crystal display (LCD) panel and a light source. The LCD panel includes a first substrate having a plurality of thin film transistors, a second substrate facing the first substrate and a liquid crystal layer interposed between the first and second substrates. The LCD panel does not generate light of its own but controls the transmission or reflection of light received from an external light source to display images. The LCD device applies an electric field to the liquid crystal layer and adjusts the intensity of the electric field to control the light transmittance through the liquid crystal layer.

Generally, LCD panels use a lamp such as a cold cathode fluorescent lamp or an external electrode fluorescent lamp as the light source.

A diffusion plate for the diffusion of light may be disposed between the light source and the LCD panel to uniformly illuminate the LCD panel.

Conventional diffusion plates generally include a light diffusing agent. The brightness level of an LCD can be lowered by the diffusing agent, thereby deteriorating the image quality.

SUMMARY OF THE INVENTION

According to an exemplary embodiment of the present invention, an optical plate includes a main body plate, and a plurality of lens patterns formed on a first surface of the main body plate, wherein the lens patterns are elongated in a first direction and arranged in parallel with each other in a second direction crossing the first direction, wherein a cross section of the lens patterns forms a part of an ellipse shape, the ratio of a semi-major axis to a semi-minor axis of the ellipse shape ranging from about 1.65 to about 1.75.

A triangle which is formed by connecting opposite end points of a base line in the cross section and a summit point of the cross section may have a base angle ranging from about 38° to about 44°.

An isosceles triangle which is formed by connecting an opposite end points of a base line in the cross section and a summit point of the cross section may have a height of about 40% to about 45% of a length of the base line.

An embossing pattern may be formed on a second surface of the main body plate opposite to the first surface.

An optical plate may include an ultraviolet ray blocking layer formed on the second surface of the main body plate opposite to the first surface and including an ultraviolet ray blocking agent.

The main body plate may be substantially transparent.

According to an exemplary embodiment of the present invention, a method of manufacturing an optical plate includes providing a first roll and a second roll arranged to face each other and forming an optical plate by applying a raw fluid including a polymer material between the first and second rolls while rotating the first and second rolls in opposite directions, the second roll including a plurality of concave lens patterns formed along a circumference thereof and arranged in parallel with each other in a lengthwise direction of the second roll, and a cross section of the concave lens patterns forming a part of an ellipse shape, the ratio of a semi-major axis to a semi-minor axis of the ellipse shape ranging from about 1.65 to about 1.75.

A concave embossing pattern may be formed on the first roll.

The temperature of the raw fluid may be the same or higher than a glass transition temperature of the polymer material white passing between the first and second rolls.

According to an exemplary embodiment of the present invention, a backlight assembly comprises a light source, and an optical plate disposed in front of the light source, the optical plate including a main body plate, and a plurality of lens patterns formed on a first surface of the main body plate facing an opposite direction relative to the light source, wherein the tens patterns are elongated in a first direction and arranged in parallel with each other in a second direction crossing the first direction, wherein opposite end points of a base line in a cross section of the lens patterns and a summit point of the cross section form an isosceles triangle, a height of the isosceles triangle being about 40% to about 45% of a length of the base line.

The cross section of the lens patterns may form a part of an ellipse shape. The ratio of a semi-major axis to a semi-minor axis of the ellipse shape may range from about 1.65 to about 1.75. An embossing pattern may be formed on a second surface of the main body plate facing the light source.

The light source may include a plurality of lamps arranged in parallel with each other in the second direction and elongated in the first direction respectively.

According to an exemplary embodiment of the present invention, a liquid crystal display device comprises a liquid crystal display panel, a light source disposed behind the liquid crystal display panel, and an optical plate disposed between the liquid crystal display panel and the light source, the optical plate including a main body plate; a plurality of lens patterns formed on a first surface of the main body plate facing the liquid crystal display panel, wherein the lens patterns are elongated in a first direction and arranged in parallel with each other in a second direction crossing the first direction, and opposite end points of a base line of a cross section in the lens patterns and a summit point of the cross section form a triangle, a base angle of the triangle ranging from about 38° to about 44°.

The cross section of the lens patterns may form a part of an ellipse shape. The ratio of a semi-major axis to a semi-minor axis of the ellipse shape may range from about 1.65 to about 1.75.

The light source may include a plurality of lamps arranged in parallel with each other in the second direction, and elongated in the first direction respectively.

An embossing pattern may be formed on a second surface of the main body plate facing the light source.

BRIEF DESCRIPTION OF THE DRAWINGS

The present invention will become readily apparent to those of ordinary skill in the art when descriptions of exemplary embodiments thereof are read with reference to the accompanying drawings.

DESCRIPTION OF EXEMPLARY EMBODIMENTS

Hereinafter, exemplary embodiments of the present invention will be described with reference to the accompanying drawings. Like numerals may refer to similar or identical elements throughout the description of the figures.

A liquid crystal display device according to an exemplary embodiment of the present invention will be described with reference to FIGS. 1 through 3.

Figure 1:
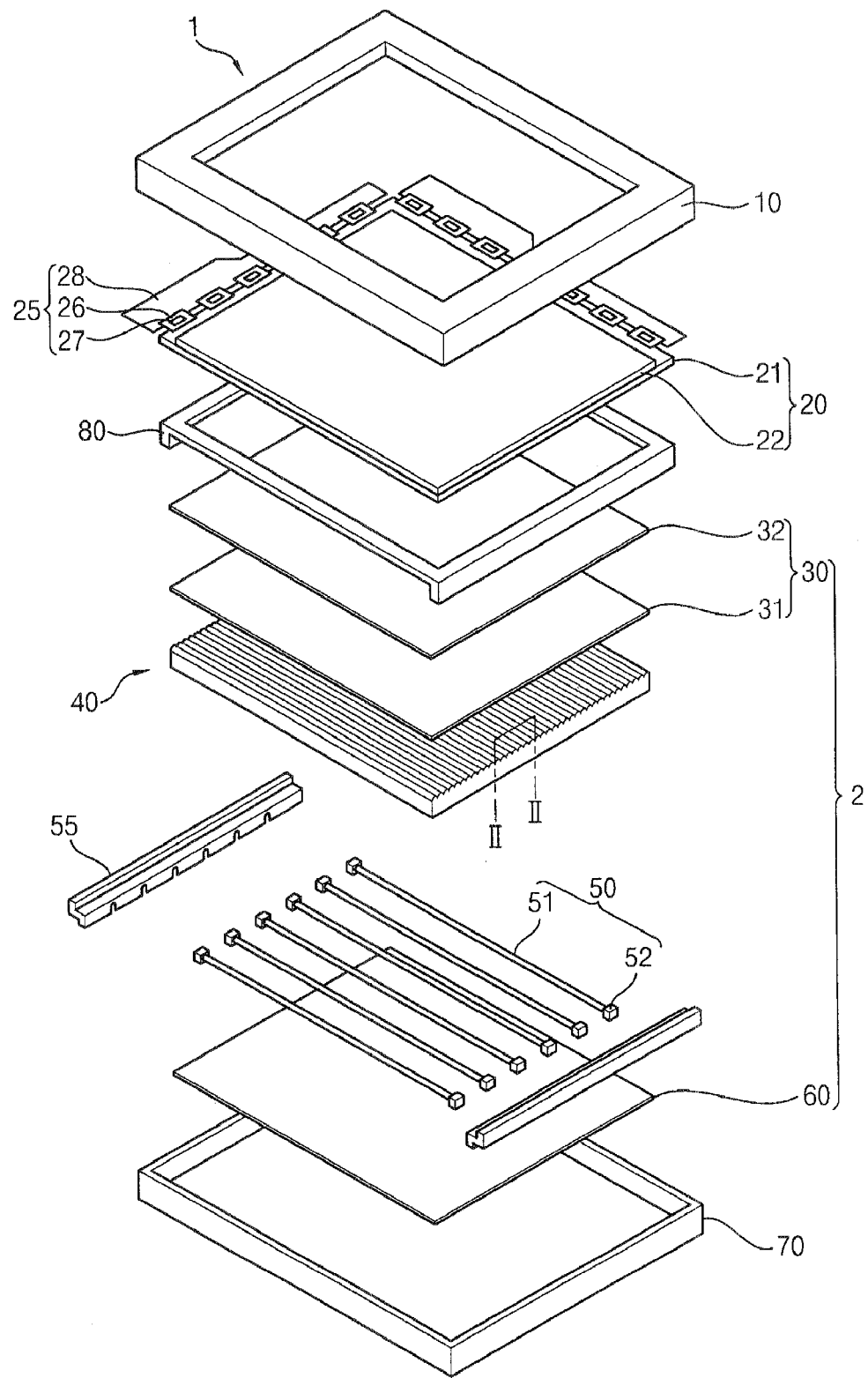
FIG. 1 is an exploded perspective view of a liquid crystal display device according to an exemplary embodiment of the present invention.

As shown in FIG. 1, a liquid crystal display device 1 includes a liquid crystal display panel 20 and a backlight assembly 2 supplying light to the liquid crystal display panel 20. The liquid crystal display panel 20 and the backlight assembly 2 are disposed between an upper cover 10 and a lower cover 70. The liquid crystal display panel 20 is disposed on a panel supporting mold 80.

The liquid crystal display panel 20 includes a first substrate 21 on which a plurality of thin film transistors are formed and a second substrate 22, which faces the first substrate 21. A liquid crystal layer (not shown) is disposed between the first substrate 21 and the second substrate 22. The liquid crystal display panel 20 receives the light from the backlight assembly 2 disposed at the rear of the liquid crystal display panel 20.

A driver 25 is provided in a lateral part of the first substrate 21 to supply an LCD driving signal. For example the driver 25 may include a flexible printed circuit board (FPC) 26 whose first side is electrically connected with the first substrate 21, a driving chip 27, which is mounted on the FPC 26, and a printed circuit board (PCB) 28, which is electrically connected with a second side of the FPC 26. The driver 25 may employ a chip on film (COF) type mounting method. The driver 25 may employ other types of chip mounting methods, such as for example, tape carrier package (TCP) and chip on glass (COG). A part of the driver 25 may be formed on the first substrate 21 during a wire-forming process.

The backlight assembly 2 includes an optical film 30, an optical plate 40 and a lamp 50, which supplies light to the optical plate 40.

The optical film 30, which is disposed behind the liquid crystal display panel 20, includes a prism film 31 and a protection film 32.

The prism film 31 may have a plurality of triangular prisms at predetermined intervals on an upper side thereof. The prism film 31 collects light beams diffused by the optical plate 40 toward a direction perpendicular to the surface of the liquid crystal display panel 20.

The prism film 31 may be used as a pair, wherein a micro prism formed in the respective prism films 31 forms a predetermined angle. The light from the prism films 31 travels in a substantially vertical direction to provide uniform brightness distribution.

The protection film 32 protects the prism films 31, which may be susceptible to scratches. The protection film 32 may include polyethylene terephtalate (PET).

A diffusion film may be provided between a prism film 31 and an optical plate 40. A reflection polarizing film may be used. The optical plate 40 is used to obtain uniform brightness of light from the lamp 50 to be supplied to the prism films 31.

Figure 2:
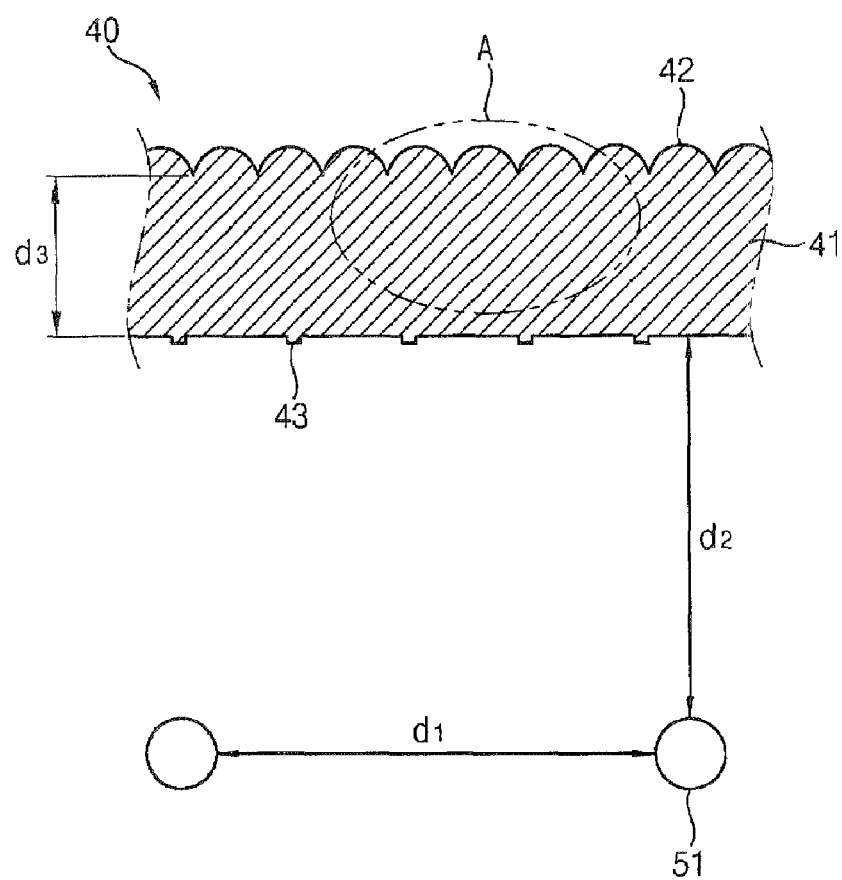
FIG. 2 is a cross-sectional view of the liquid crystal display device of FIG. 1, taken along line II-II.

FIG. 2 is a cross-sectional view of the liquid crystal display device of FIG. 1, taken along line II-II.

Referring to FIG. 2, the optical plate 40 includes a main body plate 41, for example, having a plate shape, a lens pattern 42, which is formed on a surface of the main body plate 41 facing the liquid crystal display panel 20, and an embossing pattern 43, which is formed on a surface of the main body plate 41 facing the lamp 50.

The lens pattern 42 may include a material that is different from that of the main body plate 41. The lens pattern 42 may include a UV curing resin, such as for example, acrylic resin. In an exemplary embodiment of the present invention, the lens pattern 42 is formed on the main body plate 41 which is separately provided.

Thickness d3 of the main body plate 41 may be approximately 1 mm to approximately 3 mm. In an exemplary embodiment of the present invention, the thickness d3 of the main body plate 41 is about 1 mm to about 1.6 mm. The main body plate 41 does not include a diffusing agent and is substantially transparent. A plurality of lens patterns 42 may be provided, wherein each of the lens patterns 42 is elongated in a first direction. The lens patterns 42 are arranged to contact each other in a second direction crossing the first direction. The first direction may be perpendicular to the second direction.

Figure 3:
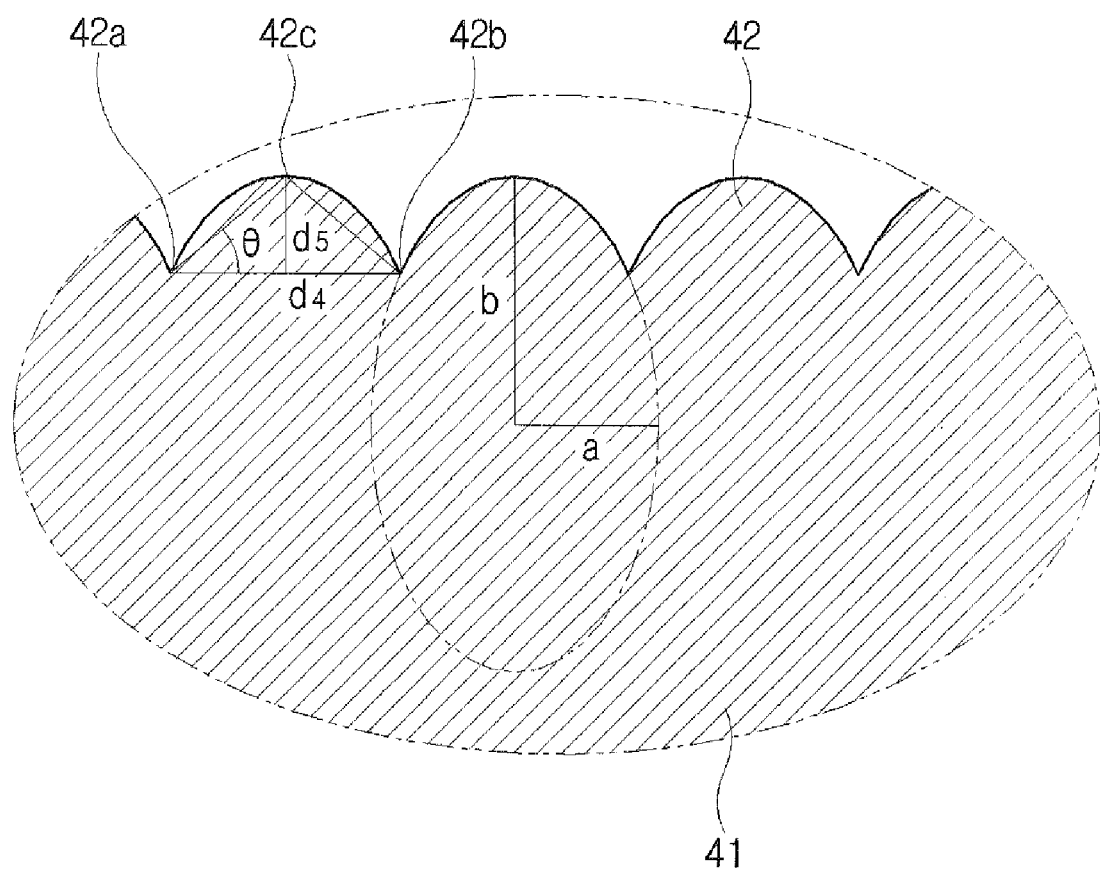
FIG. 3 is an enlarged view of part A of FIG. 2.

FIG. 3 is an enlarged view of part A of FIG. 2. As shown in FIG. 3, a cross section of the lens patterns 42 forms a part of an ellipse shape. The ratio of the semi-major axis (b) to the semi-minor axis (a) of the ellipse may range from about 1.65 to about 1.75.

In FIG. 3, end points 42a and 42b of a cross section of a lens pattern 42 and a summit point 42c thereof are connected by lines to form a triangle. The triangle may be an isosceles triangle. In an exemplary embodiment of the present invention, the base angle θ of the triangle is about 38° to about 44°. A height d5 of the triangle may be about 40% to about 45% of the length d4 of the base line.

The pitch between the lens patterns 42 may be about 50 μm to about 400 μm. In an exemplary embodiment, the plurality of lens patterns 42 contact each other at end points 42a and 42b. The pitch, which may be defined as the distance between the respective summit points 42c of the lens patterns 42, may be the same as the length d4 of the base line in the respective lens patterns 42.

The embossing pattern 43 may be formed regularly as shown in FIG. 2.

A plurality of lamps 50 are provided, and each of the lamps 50 is elongated in the first direction. The lamps 50 are arranged in parallel with each other in the second direction.

The lamps 50 include a lamp main body 51 and electrode supporters 52, which are disposed in opposite end parts of the lamp main body 51. A lamp electrode (not shown) is disposed in the electrode supporters 52.

The lamps 50 may include, for example, a cold cathode fluorescent lamp (CCFL) or an external electrode fluorescent lamp (EEFL). The lamps 50 may include a light emitting diode or a surface light source as a light source.

The opposite end parts of the lamps 50, i.e., the electrode supporters 52, are accommodated in the side mold 55. The side mold 55 may include a plastic material, the surface of which may be coated with a reflection layer to improve reflection properties.

The lamps 50 may be connected with a socket disposed in a side mold 55 to receive power.

A reflection plate 60 is disposed under the lamps 50 and reflects downward light toward the optical plate 40. The reflection plate 60 may include a plastic material, such as for example, polyethylene terephtalate (PET) or poly carbonate (PC).

Light generated by the lamps 50 provides uniform brightness while passing through the optical plate 40. According to an exemplary embodiment of the present invention, the optical plate 40 does not include a diffusing agent, and light loss due to light absorption of the optical plate 40 may be minimized.

Figure 4:
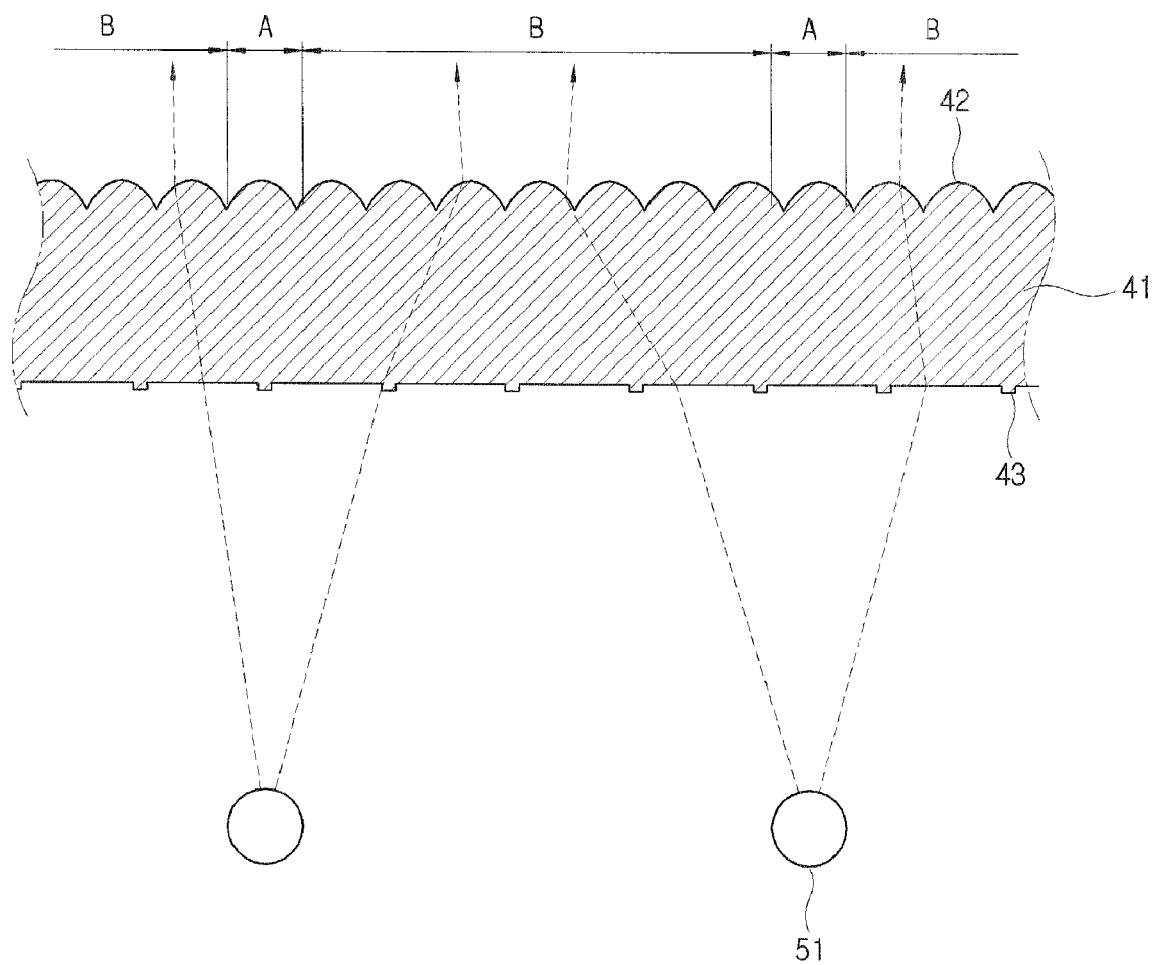
FIG. 4 is a cross-sectional view for illustrating a flow of light through the liquid crystal display device of FIG. 1, according to an exemplary embodiment of the present invention.

The flow of light passing through the liquid crystal display device 1 according to an exemplary embodiment of the present invention will be described with reference to FIG. 4. FIG. 4 is a cross-sectional view for illustrating a flow of light through the liquid crystal display device of FIG. 1, according to an exemplary embodiment of the present invention.

Referring to FIG. 4, a relatively large amount of light may be supplied from the lamps 50 to a region A, which is located above the lamps 50, and a relatively small amount of light may be supplied to a region B, which is located between the lamps 50. The light that is supplied by the lamps 50 is incident to the embossing pattern 43 of the optical plate 40. The light may be dispersed, providing light from the lamps 50 to the optical plate 40 uniformly.

The light is transmitted from the main body plate 41 to the lens patterns 42. The main body plate 41 is substantially transparent, and the brightness may be about 10% improved as compared with a conventional optical plate using a diffusing agent.

The light collected by the lens patterns 42 and emitted therefrom is mixed with light emitted from the neighboring lens patterns 42 to provide uniform brightness.

If a circular lens pattern having a cross section of a circular shape is used, brightness distribution of the output light becomes sharp corresponding to the respective circular lens patterns 42. If a prism lens pattern having a cross section of a triangular shape is used, brightness distribution of the output light becomes split corresponding to the respective prism lens patterns 42. Both the circular lens patterns and the prism lens patterns may provide marginal uniform brightness distribution.

When the lens pattern 42 having a cross section of an elliptical shape according to an exemplary embodiment of the present invention is used, the brightness distribution of the output light becomes broad corresponding to the respective lens patterns 42, and uniform brightness distribution may be provided.

The brightness distribution of light that passes through the lens patterns 42 may be determined by the shape of the lens patterns 42, e.g., a ratio of the semi major axis (b)/the semi minor axis (a) of the ellipse, as shown in FIG. 2, called an aspect ratio.

<Table 1> illustrates a simulation result of uniformity in brightness distribution while the aspect ratio and the base angle θ are adjusted. The brightness distribution is estimated from three directions relative to the optical plate 40, i.e., an upper front surface a 16° lateral side, and a 32° lateral side of the optical plate 40.

The uniformity of the brightness distribution is represented by the ratio of lowest brightness to highest brightness among the values estimated from the respective directions relative to the optical plate 40. The higher the value, the better the brightness uniformity.

TABLE 1

| aspect ratio (b/a) | | | 1.5 | 1.6 | 1.7 | 1.8 | 1.9 | 2.0 |
|---|---|---|---|---|---|---|---|---|
| front side | base angle | 40° | 0.86 | 0.87 | 0.92 | 0.87 | 0.86 | 0.85 |
| | base angle | 42° | 0.85 | 0.86 | 0.90 | 0.88 | 0.88 | 0.85 |
| 16° lateral side | base angle | 40° | 0.82 | 0.81 | 0.86 | 0.88 | 0.86 | 0.87 |
| | base angle | 42° | 0.82 | 0.81 | 0.86 | 0.87 | 0.87 | 0.87 |
| 32° lateral side | base angle | 40° | 0.80 | 0.81 | 0.84 | 0.79 | 0.79 | 0.83 |
| | base angle | 42° | 0.80 | 0.77 | 0.84 | 0.82 | 0.81 | 0.81 |
| average | | | 0.82 | 0.82 | 0.87 | 0.85 | 0.85 | 0.84 |

As shown in <Table 1>, when the aspect ratio is 1.7, the brightness uniformity becomes the highest. In an exemplary embodiment of the present invention, an aspect ratio in the range of about 1.65 to about 1.75 is employed.

Referring to FIG. 2, the brightness may become uniform if a distance d1 between the lamps 50 is short, for example, where the number of the lamps 50 is increased. Also, the brightness may become uniform if a distances d2 between the lamps 50 and the optical plate 40 is increased.

According to an exemplary embodiment of the present invention, the distance d1 between the lamps 50 may increase by using the optical plate 40 which provides high brightness uniformity, and fewer lamps 50 may be needed, and production costs may be reduced.

According to an exemplary embodiment of the present invention, the distance d2 between the lamps 50 and the optical plate 40 may decrease by using the optical plate 40 having high brightness uniformity, and the thickness of the liquid crystal display device 1 may be reduced.

Figure 5:
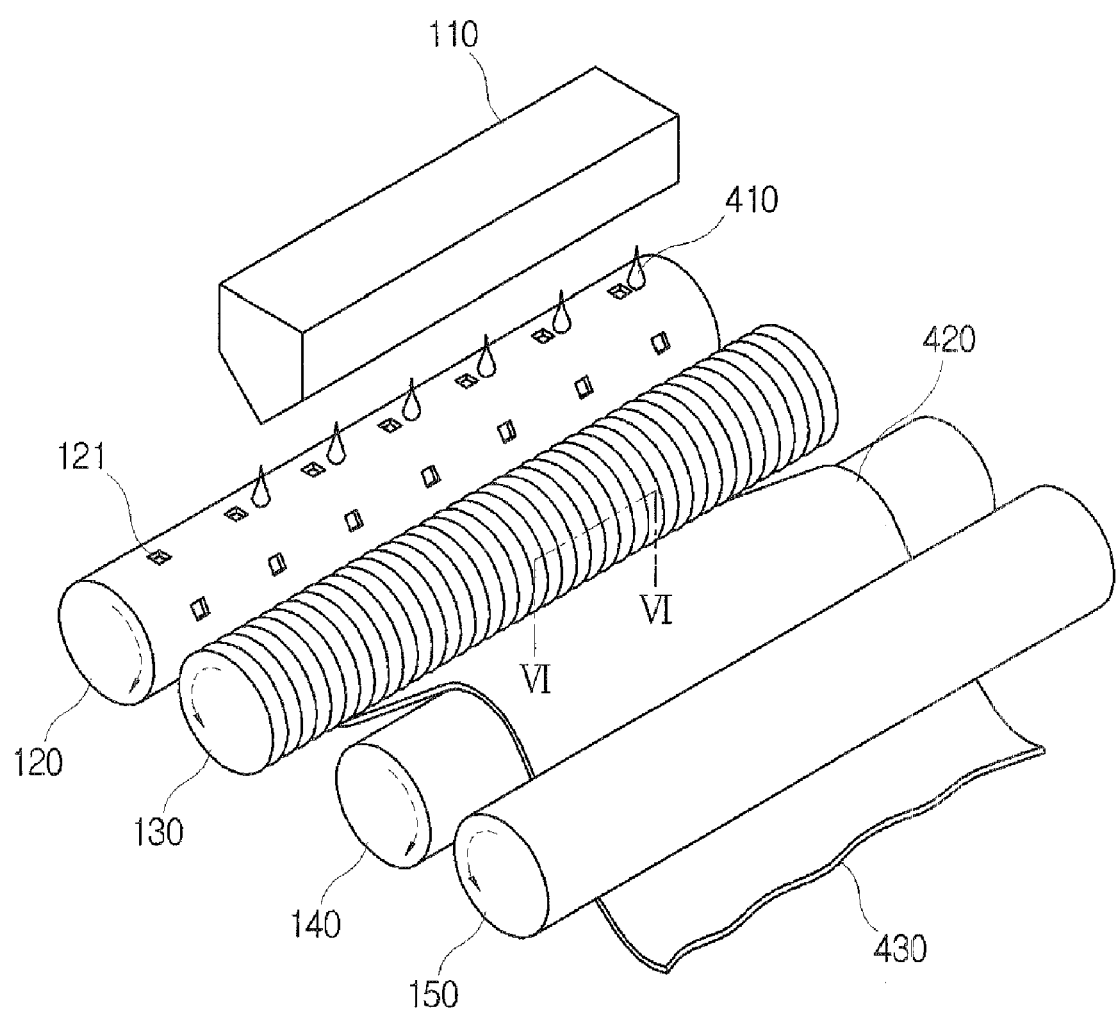
FIG. 5 illustrates a method of manufacturing an optical plate of a liquid crystal display device according to an exemplary embodiment of the present invention.
Figure 6:
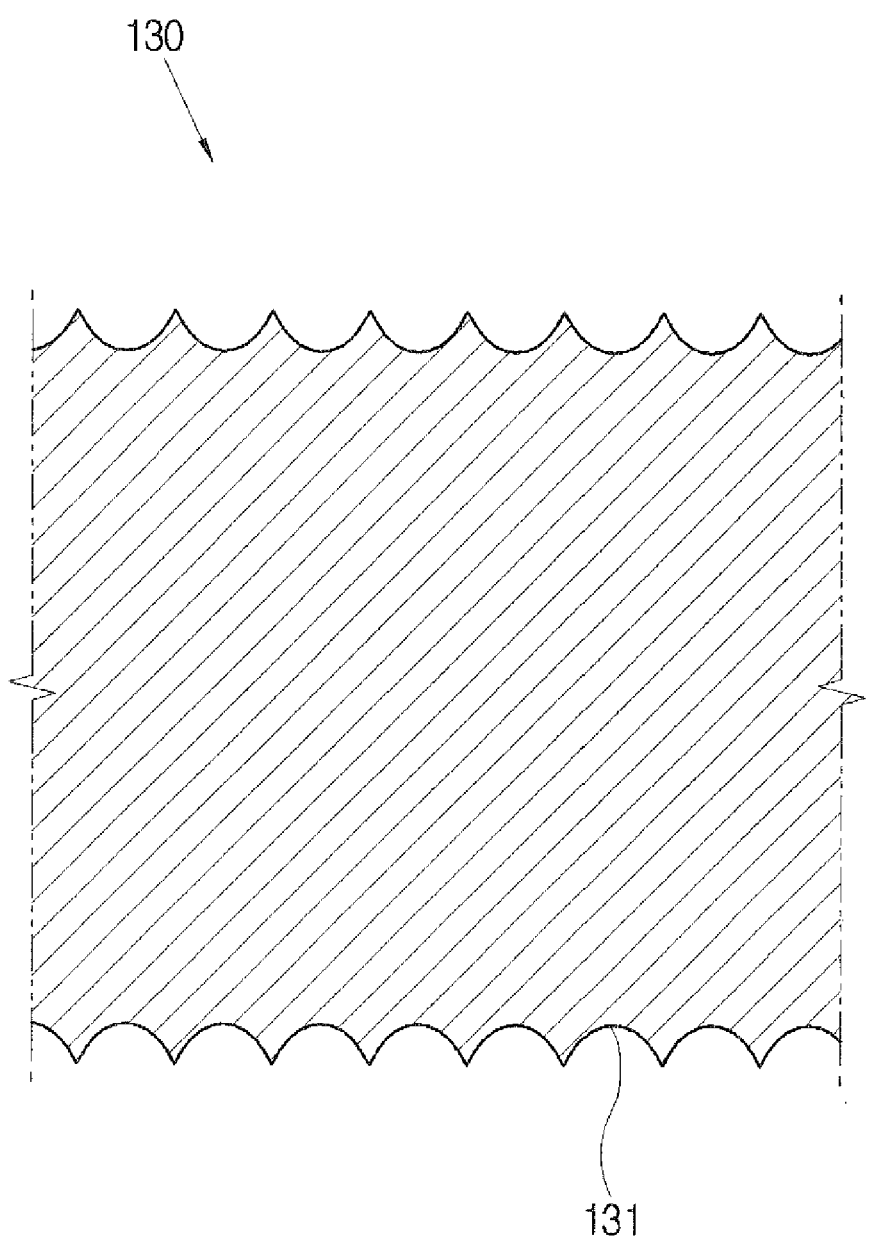
FIG. 6 is a cross-sectional view of the liquid crystal display device of FIG. 5, taken along line VI-VI.

Hereinafter, a method of manufacturing the optical plate 40, according to an exemplary embodiment of the present invention, will be described with reference to FIGS. 5 and 6. FIG. 5 illustrates a method of manufacturing an optical plate of a liquid crystal display device according to an exemplary embodiment of the present invention. FIG. 6 is a cross-sectional view of the liquid crystal display device of FIG. 5, taken along line VI-VI.

A polymer material, which is used to make the optical plate 40, is heated to become a raw fluid 410.

The raw fluid 410 is supplied between a first roll 120 and a second roll 130 through a slit coater 110.

The first roll 120 and the second roll 130 face each other and rotate in opposite directions.

A concave embossing pattern 121 is formed on a surface of the first roll 120 corresponding to the embossing pattern 43 of the optical plate 40.

A plurality of concave lens patterns 131, as shown in FIG. 6, are formed on a surface of the second roll 130 corresponding to the lens patterns 42 of the optical plate 40. The concave lens patterns 131 are formed along a circumference of the second roll 130 and arranged in parallel with each other in a lengthwise direction of the second roll 130.

The raw fluid 410 becomes a first raw optical plate 420, which has a plate shape, while passing between the first and second rolls 120 and 130. While passing therebetween, the embossing pattern 43 is formed on a first surface of the first raw optical plate 420 by the concave embossing pattern 121, and the lens patterns 42 are formed on a second surface of the first raw optical plate 420 by the concave lens patterns 131.

While passing between the first and second rolls 120 and 130, the temperature of the raw fluid 410 is higher than a glass transition temperature of the polymer material. If the temperature of the raw fluid 410 is lower than the glass transition temperature of the polymer material, the strength of raw fluid 410 increases, making it difficult to form the lens patterns 42 and the embossing pattern 43.

Then, the first raw optical plate 420 is cooled down and polished while passing between a third roll 140 and a fourth roll 150 to form a second raw optical plate 430. A surface of the third and fourth rolls 140 and 150 may be a mirror surface.

The temperature of the first raw optical plate 420 passing between the third and fourth rolls 140 and 150 is below the glass transition temperature of the polymer material. If the temperature of the first raw optical plate 420 is higher than the glass transition temperature of the polymer material while passing the third and fourth rolls 140 and 150, the lens patterns 42 and the embossing pattern 43 may be damaged.

The second raw optical plate 430 is cut out to form the optical plate 40.

In an exemplary embodiment of the present invention, the main body plate 41, the lens patterns 42 and the embossing pattern 43 are formed at least substantially simultaneously as a single body.

The optical plate 40 may be formed by an injection molding method. In this case, a main body plate 41, a lens pattern 42 and an embossing pattern 43 may be formed at least substantially simultaneously.

The lens pattern 42 may include a UV curing resin. For example, the lens pattern 42 may be formed by forming a UV curing resin layer on the main body plate 41, patterning the UV curing resin layer with a stampler having a concave lens pattern, and curing the resin layer by exposure to ultraviolet rays to form the lens pattern 42.

Figure 7:
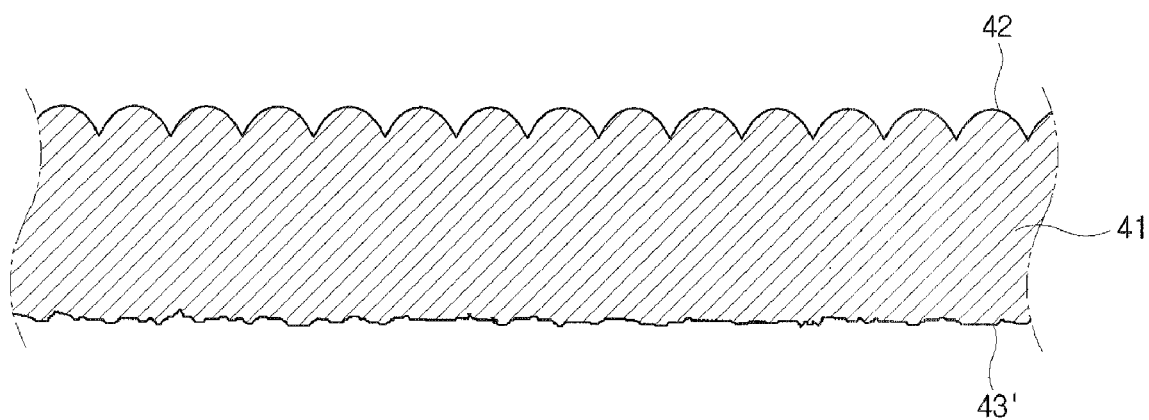
FIG. 7 is a sectional view of a liquid crystal display device according to an exemplary embodiment of the present invention.

A liquid crystal display device according to an exemplary embodiment of the present invention will be described with reference to FIG. 7.

An embossing pattern 43' of an optical plate 40 is formed irregularly. For example, the embossing pattern 43' may be formed by a sand blasting method.

Figure 8:
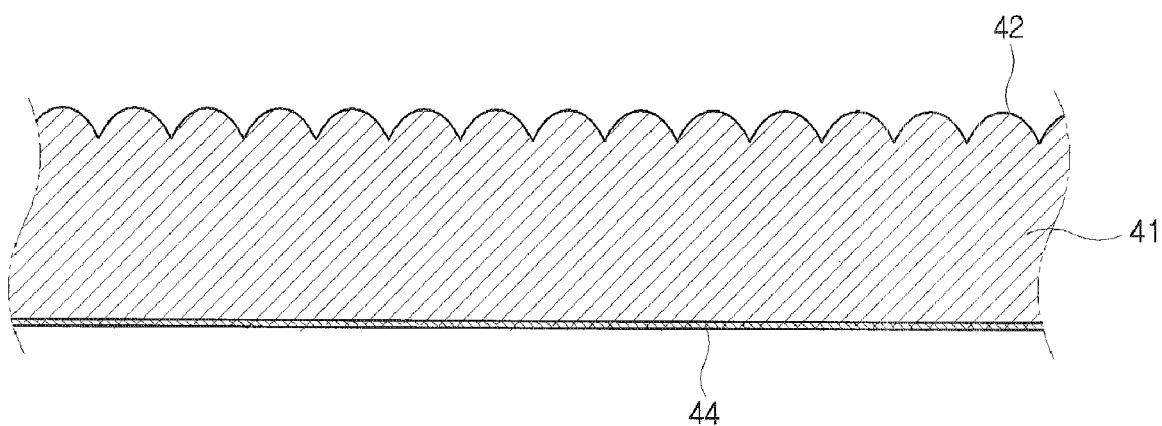
FIG. 8 is a sectional view of a liquid crystal display device according to an exemplary embodiment of the present invention.

A liquid crystal display device according to an exemplary embodiment of the present invention will be described with reference to FIG. 8.

An optical plate 40 includes an ultraviolet ray-blocking layer 44. The ultraviolet ray-blocking layer 44 faces the lamps 50 and blocks ultraviolet rays from the lamps 50. The ultraviolet ray-blocking layer 44 includes a UV blocking agent.

In another exemplary embodiment, an optical plate 40 may include an antistatic layer, which faces the lamps 50.

An optical plate according to an exemplary embodiment of the present invention has high light efficiency.

A method of manufacturing an optical plate having a high light efficiency, and a backlight assembly and a liquid crystal display device that include an optical plate having high light efficiency, according to exemplary embodiments of the present invention, may improve the brightness of an LCD.

Although exemplary embodiments of the present invention have been described in detail with reference to the accompanying drawings for the purpose of illustration, it is to be understood that the inventive processes and apparatus should not be construed as limited thereby. It will be apparent to those of ordinary skill in the art that various changes and modifications to the foregoing exemplary embodiments may be made without departing from the scope of the present invention as defined by the appended claims, with equivalents of the claims to be included therein.

What is claimed is:

1. An optical plate, comprising:
a main body plate; and
a plurality of lens patterns formed on a first surface of the main body plate, wherein the lens patterns are elongated in a first direction and arranged in parallel with each other in a second direction crossing the first direction,
wherein a cross section of the lens patterns forms a part of an ellipse shape, the ratio of a semi-major axis to a semi-minor axis of the ellipse shape ranging from about 1.65 to about 1.75.

2. The optical plate according to claim 1, wherein an isosceles triangle formed by connecting opposite end points of a base line in the cross section and a summit point of the cross section has a base angle ranging from about 38° to about 44°.

3. The optical plate according to claim 1, wherein an isosceles triangle formed by connecting opposite end points of a base line in the cross section and a summit point of the cross section has a height of about 40% to about 45% of a length of the base line.

4. The optical plate according to claim 1, wherein an embossing pattern is formed on a second surface of the main body plate opposite to the first surface.

5. The optical plate according to claim 1, further comprising an ultraviolet ray blocking layer formed on a second surface of the main body plate opposite to the first surface and including an ultraviolet ray blocking agent.

6. The optical plate according to claim 1, wherein the main body plate is substantially transparent.

7. A method of manufacturing an optical plate, the method comprising:
providing a first roll and a second roll arranged to face each other; and
forming an optical plate by applying a raw fluid including a polymer material between the first and second rolls white rotating the first and second rolls in opposite directions,
the second roll including a plurality of concave lens patterns formed along a circumference thereof and arranged in parallel with each other in a lengthwise direction of the second roll, and
a cross section of the concave lens patterns forming a part of an ellipse shape, the ratio of a semi-major axis to a semi-minor axis of the ellipse shape ranging from 1.65 to 1.75.

8. The method according to claim 7, wherein a concave embossing pattern is formed on the first roll.

9. The method according to claim 7, wherein a temperature of the raw fluid is the same or higher than a glass transition temperature of the polymer material while passing between the first and second rolls.

10. A backlight assembly, comprising:
a light source; and
an optical plate disposed in front of the light source,
the optical plate including:
a main body plate; and
a plurality of lens patterns formed on a first surface of the main body plate facing an opposite direction relative to the light source, wherein the lens patterns are elongated in a first direction and arranged in parallel with each other in a second direction crossing the first direction,
wherein opposite end points of a base line in a cross section of the lens patterns and a summit point of the cross section form an isosceles triangle,
a height of the isosceles triangle being 40% to 45% of a length of the base line.

11. The backlight assembly according to claim 10, wherein the cross section of the lens patterns forms a part of an ellipse shape.

12. The backlight assembly according to claim 11, wherein the ratio of a semi-major axis to a semi-minor axis of the ellipse shape ranges from about 1.65 to about 1.75.

13. The backlight assembly according to claim 12, wherein an embossing pattern is formed on a second surface of the main body plate facing the light source.

14. The backlight assembly according to claim 12, wherein the light source comprises a plurality of lamps which is arranged in parallel with each other in the second direction and elongated in the first direction respectively.

15. A liquid crystal display device, comprising:
a liquid crystal display panel;
a light source disposed behind the liquid crystal display panel; and
an optical plate disposed between the liquid crystal display panel and the light source,
the optical plate including:
a main body plate;
a plurality of lens patterns formed on a first surface of the main body plate facing the liquid crystal display panel, wherein the lens patterns are elongated in a first direction and arranged in parallel with each other in a second direction crossing the first direction, and
opposite end points of a base line of a cross section in the tens patterns and a summit point of the cross section form a triangle,
a base angle of the triangle ranging from about 38° to about 44°.

16. The liquid crystal display device according to claim 15, wherein the cross section of the lens patterns forms a part of an ellipse shape.

17. The liquid crystal display device according to claim 16, wherein the ratio of a semi-major axis to a semi-minor axis of the ellipse shape ranges from about 1.65 to about 1.75.

18. The liquid crystal display device according to claim 15, wherein the light source comprises a plurality of lamps arranged in parallel with each other in the second direction and elongated in the first direction respectively.

19. The liquid crystal display device according to claim 18, wherein an embossing pattern is formed on a second surface of the main body plate facing the light source.

\* \* \* \* \*